United States Patent

Demars et al.

Patent Number: 5,540,514
Date of Patent: Jul. 30, 1996

[54] MECHANICAL CONNECTION BETWEEN A GLAZING ELEMENT AND A SUPPORTING STRUCTURE

[75] Inventors: Yves Demars, Clermont; Rene Poix, Noyon, both of France

[73] Assignee: Saint-Gobain Vitrage, Courbevoie, France

[21] Appl. No.: 351,132

[22] Filed: Nov. 30, 1994

[30] Foreign Application Priority Data

Nov. 30, 1993 [FR] France ................... 93 14338

[51] Int. Cl.⁶ ............... B25G 3/36; F16D 1/12; F16C 11/00; E04B 2/00
[52] U.S. Cl. ............ 403/388; 403/76; 403/122; 403/143; 411/537; 411/379; 52/235; 52/506.05
[58] Field of Search ............ 403/26, 76, 77, 403/112, 113, 114, 115, 118, 120, 135, 133, 132, 147, 149, 145; 52/235, 508, 509, 512, 506.05; 411/537, 379, 380, 381, 382, 383, 396

[56] References Cited

U.S. PATENT DOCUMENTS

| | | | |
|---|---|---|---|
| 1,410,004 | 3/1922 | Dodds | 411/379 |
| 4,431,353 | 2/1984 | Capuano | 411/537 X |
| 4,666,330 | 5/1987 | O'Connell | |
| 4,689,928 | 9/1987 | Dutton | 52/235 |

FOREIGN PATENT DOCUMENTS

| | | |
|---|---|---|
| 0201212A1 | 11/1986 | European Pat. Off. |
| 0340089 | 11/1989 | European Pat. Off. |
| 0506522A1 | 9/1992 | European Pat. Off. |
| 0552101 | 7/1993 | European Pat. Off. |

*Primary Examiner*—Brian K. Green
*Assistant Examiner*—Bruce A. Lev
*Attorney, Agent, or Firm*—Oblon, Spivak, McClelland, Maier & Neustadt, P.C.

[57] ABSTRACT

An assembly for mechanically hanging a glazing element to a supporting structure uses an articulated fixing system allowing the plate to tilt about its support point on said system. It includes a cavity defining element engaging the glazing element and a carrying element connectable to the supporting structure and having a portion fittable in a cavity defined by said cavity defining element so as to form an articulated connection with said cavity defining element. The articulated connection has a bearing region and supports the glazing element for turning with a pendular motion about the bearing region. This makes possible a bending movement of controlled amplitude of the glazing element.

18 Claims, 7 Drawing Sheets

FIG_1

FIG_2

FIG_3

FIG_4

MECHANICAL CONNECTION BETWEEN A GLAZING ELEMENT AND A SUPPORTING STRUCTURE

BACKGROUND OF THE INVENTION

1. Field of the Invention

This invention relates to mechanical connection systems enabling plates, notably glazing elements, to be fixed to a supporting structure. The invention is concerned more especially with the fixing of glazing elements to a supporting structure by a technique consisting of fixing said elements, not by their periphery by means of a peripheral frame, but by means of mechanical hooking points, usually situated at each of their corners.

2. Description of the Related Art

Glazing elements fixed in this manner are known as suspended external glazings or structural glazings (hereinafter referred to simply as structural glazings). This type of fixing, which is very unobtrusive, makes possible the construction of outer walls for buildings constituted entirely of glazing elements, some being transparent to fulfill the function of viewing panes, the others opaque and generally fulfilling the function of a wall. Such external walls exhibit a minimal surface discontinuity as seen from the outside.

The desire for an aesthetic appearance, however, should not be allowed to detract from the reliability of the fixing, and the design of these point connections should take into account various requirements from a mechanical aspect. Thus, these connections must guarantee a firm and effective transverse fixing between the glazing element and the carrying structure which will support the weight of the glazing element without risk of breakage. On the other hand, the glazing element, once in position, must be capable of responding without breaking to loads of various natures, and in particular to stresses which have a tendency to flex the element, such as wind induced stresses. The connection should therefore allow a flexure of a few degrees in the glazing element.

Lastly, if the glazing element should be a multiple pane of the double glazing type, where different glazing plates are assembled with a gas space between them by means of a peripheral seal, it is important not to subject said seal to excessive shear forces resulting from the transfer of the weight of the glazing plates to the plate that is effectively fixed to the structure.

Various fixings for panes of such structural glazings have already been proposed. For example, in European Patent Application EP-A-0 192 472, there are described fixings elements for a double glazing making possible, by simple screwing with a milled countersunk screw, the tightening of one or another of the panes of the double glazing against the supporting structure. There is, however, no connection between the two sheets of the double glazing which can resist the longitudinal sliding of the sheet that is not fixed by this through screw. This places a heavy load on the peripheral seal of the double glazing. Moreover, if the fixing described allows a certain flexibility of the double glazing after it has been fixed, this is due only to the presence of seals of compressible material, which allow a certain deflection of this screw relative to the orifice or orifices formed in the sheet or sheets of the double glazing. This flexibility is therefore both very small and uncontrollable.

There is also known, notably from European Patent Application EP-A-0 506 522, a system of mechanical connection which enables the positioning of the glazing element relative to the structure to be corrected or, in the case of multiple panes, all the successive orifices perforated through each of the sheets of said panes to be recentered, this being achieved by means of a system of eccentric rings placed in one of said orifices. A swivel joint system is also provided and comprises a ball member and a socket member. It permits the double glazing to tilt in a spherical movement about the center of the swivel joint, which is located in the gas cavity of the double glazing. The flexibility of the pane is thereby guaranteed but the swivel joint requires a perfect fit between the head of the ball and the hemispherical cavity in which it is to be seated in order to prevent any risk of jamming between these two components. High accuracy with regard to the dimensioning of the components is therefore necessary, which leads to fairly high manufacturing costs.

SUMMARY OF THE INVENTION

It is an object of the present invention to alleviate these disadvantages by proposing a new type of mechanical connection between panes of the structural glazing type and their supporting structure, a connection which can make possible both reliable fixing of the pane to its structure and preserving for the pane a capacity for bending in a durable and controlled manner, that does not introduce penalties in terms of cost and complexity of manufacture.

The above and other objects are achieved according to the present invention by a mechanical connection assembly, notably by hooking or hanging in a substantially vertical plane, of a plate, notably a glazing element, to a supporting structure. This connection is designed so as to allow a flexing movement of controlled amplitude to the plate by means of an articulated fixing system allowing the plate to tilt about a support point on the system.

The invention is applicable to any glazing element, whether monolithic, laminated and/or multiple panes of the double glazing type. It replaces a spherical movement about the center of a swivel joint with a pendular movement about a support point, which pendular movement generates little or no friction between mechanical components, but rather crushing or "bruising" points or regions of small area, the location of which is known. The articulated system according to this invention can be simple to manufacture.

Furthermore, the system undergoes relatively little wear, notably if it is possible to provide the predictable zone at which the contact forces generated by the articulation will act with suitable reinforcing means. It should be noted that, in any event, a possible slight wear in this region is without risk since the pane remains firmly fixed.

A preferred embodiment of this articulated fixing according to the invention includes at least one element defining a receiving cavity generally rounded in the zone of the bearing point, and a carrying element comprising a rod capable of being connected to the supporting structure. The rod terminates at one of its ends in a widened head comprising a rounded lateral surface, the head being adapted for being seated with a certain clearance in the cavity in such a way that, once in position, its rounded lateral surface is in contact with the bearing region in the cavity. The radius of curvature of said rounded lateral surface is smaller than that of the receiving cavity. At least one clamping/blocking element holds the head in the receiving cavity.

The receiving cavity is preferably of a geometrically simple shape, notably a shape of revolution and, more especially, cylindrical. The widened head, adapted to the type of cavity, has a flattened front face, notably a truncated face, and a lateral surface which is also a surface of revolution and substantially convex.

Thus, in reality, any potential risk of jamming or seizing at the articulation is eliminated because the bearing region situated at the convex surface of the head (in the upper part, once the glazing element has been fixed vertically to the facade) is very localized and because tilting about this bearing zone is made possible by the clearance that has been defined between the receiving cavity and the head. As mentioned earlier, the friction created is considerably reduced with the articulation according to this invention. Instead, localized crushing forces are applied between head and receiving cavity, whose nature is different from friction forces.

It should also be noted that, although a certain play must be allowed, there is no sphere/hemispherical cavity fitting that must precede the effective installation of the pane on the facade, on site. A gain is thus made in simplicity of production and it is also possible to assemble the mechanical connection in several steps, for example, both on the production line for the pane itself and then after arrival on site.

Preferably, a compressible and/or flexible material, notably in the form of a seal, may be interposed between the base of the receiving cavity and the front face of the head of the rod element. The same type of material may also be interposed between the clamping element and the rear face of the head of the rod element, preferably in the form of a washer slipped around the rod.

These compressible and/or flexible materials are preferably of an elastomer preferably having a Shore hardness of between 30 and 80, particularly between 40 and 60. Materials of a metallic nature may also be used, notably "Belleville" type spring-washers.

This interposition of compressible materials enables the tilting movement of the glazing element relative to its bearing point (or zone) on the articulated head to be greatly facilitated. These seals enable the head to be chocked with flexibility in its receiving cavity and to "accompany" the tilting movement of the pane by compressing locally in an appropriate manner, and prevent the tilting in the articulated system according to this invention from generating disagreeable noises, when the components involved are of metal, for example.

More precisely, it is possible to choose the geometrical shape of the head of the element equipped with the rod so that it has a lateral surface of revolution, this head comprising two conical portions on either side of a plane annular portion, in which the bearing point of the glazing element, once it is in position, will be situated. The "globally" rounded surface is thus constituted of these cones joined together by a ring, the radius of curvature being understood as that of the two cones, if they were directly side-by-side. It is therefore a relatively simple shape to design, which it will be very simple to place correctly in the appropriate receiving cylindrical cavity, either at the position where the pane is manufactured or on the site of the building to which it is to be fitted.

With regard to the receiving cavity, this is preferably defined by a hollow screw passing through the whole or a part of the plate to be fixed, notably a bevelled-head screw (also called a countersunk screw). The cavity may advantageously be lined with a material having a higher mechanical strength than that of the body of the screw. In this manner the risk is still further reduced of localized crushing of the cavity by bruising of the articulation components as a result of the permanent loads applied onto the head and of the bending of the plate.

The element known as the clamping or blocking element may consist of a portion of a hollow screw, held in position by a nut or lock-nut and disposed around the rod terminating in the above-defined bead. The internal profile of the element, for example having a diverging profile, is preferably designed so as to allow a sufficient deflection of the rod in this screw portion.

The receiving cavity may also be defined by more than one element, and notably a hollow screw defining the base of the cavity, into which is fitted, preferably by screwing, another component which defines the lateral walls of this cavity.

Any adaptations of this quite specific type of articulated fixing can be envisaged, depending upon the type of plate that it is desired to fix.

The simplest case is that of the monolithic pane comprising only a single glass substrate. The mechanical connection then comprises a hollow screw defining a receiving cavity of revolution, a screw having a bevelled, countersunk head placed in a countersunk hole formed in the pane, with possible interposition of a ring seal, so that the head of the screw is flush with one of the faces of the pane. It also comprises a rod terminating in a head engaged with play in the receiving cavity of the screw and held in place by a threaded clamping piece, and compressible seals placed in the cavity in order to allow a flexible tilting of the pane relative to its bearing point on the head, and an external lock-nut which is screwed onto the screw and the threaded clamping piece against the other face of the pane, with the possible interposition of a compressible seal between glass and lock-nut.

If, on the other hand, a double glazing unit is involved, each pane is perforated with successive circular holes. It is then necessary to seal them, notably by means of a metal sealing ring associated with a double-seal of butyl and of elastomer of the silicone type. The connection may then comprise a hollow screw which passes through the double glazing unit and is flush with the surface of the outer pane through a countersunk hole, optionally with the interposition of a ring seal. A nut, if desired, is provided with at least one seal which fixes the screw to the outer pane of the double glazing unit. A rod element has a head intended to be seated in a receiving cavity in the screw, a portion of hollow screw having a diverging internal profile, which is fitted around the rod to hold the head in the cavity by screwing in the nut. Compressible seals in the cavity facilitate the tilting of the head in the cavity about a bearing point. An external lock-nut permits, on the inner side of the glazing unit, the tightening of the assembly by screwing onto the hollow screw portion, notably by bearing against the sealing ring of the holes perforated in the glass sheets.

Preferably, it is possible to dispose, in the hole formed in the inner pane of the double glazing, two eccentric circular rings in contact with the nut which thereby supports the inner pane.

In the case of laminated panes, the mechanical connection according to this invention can comprise a hollow screw, optionally provided with a ring seal, into which a hollow component is fitted, the association of these two components defining the receiving cavity. The hollow screw passes preferably only through the inner plate of the laminated pane. The connection then also comprises the rod element, the head of which is engaged into the receiving cavity, and is held by a threaded clamping piece, seals of compressible material accompanying the tilting of the head in the cavity about the bearing point for the pane. A lock-nut is screwed onto the hollow piece and onto the clamping component against the face of the inner plate of the pane with the optional interposition of a flexible seal.

A laminated pane, once fixed in this manner, appears, as viewed from the outside, devoid of any projecting or visible fixing element.

The invention is also directed to the use of the mechanical connecting assembly defined above for forming outer walls of large area from panes of the structural glazing type, as well as any pane equipped with at least one of these connections intended for fixing it to a supporting structure.

The invention is also directed to any assembly of panes disposed edge-to-edge to define the surface of an outer wall, in which the panes are fixed by hooking or hanging from a supporting structure, optionally via a bracing system, by means of the above-defined mechanical connections, and also to all installation operations necessary for said connections.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

It should be stated that the proportions between the various elements shown in the figures are not rigorously respected in the figures, in order to facilitate an understanding thereof.

Figure 1:
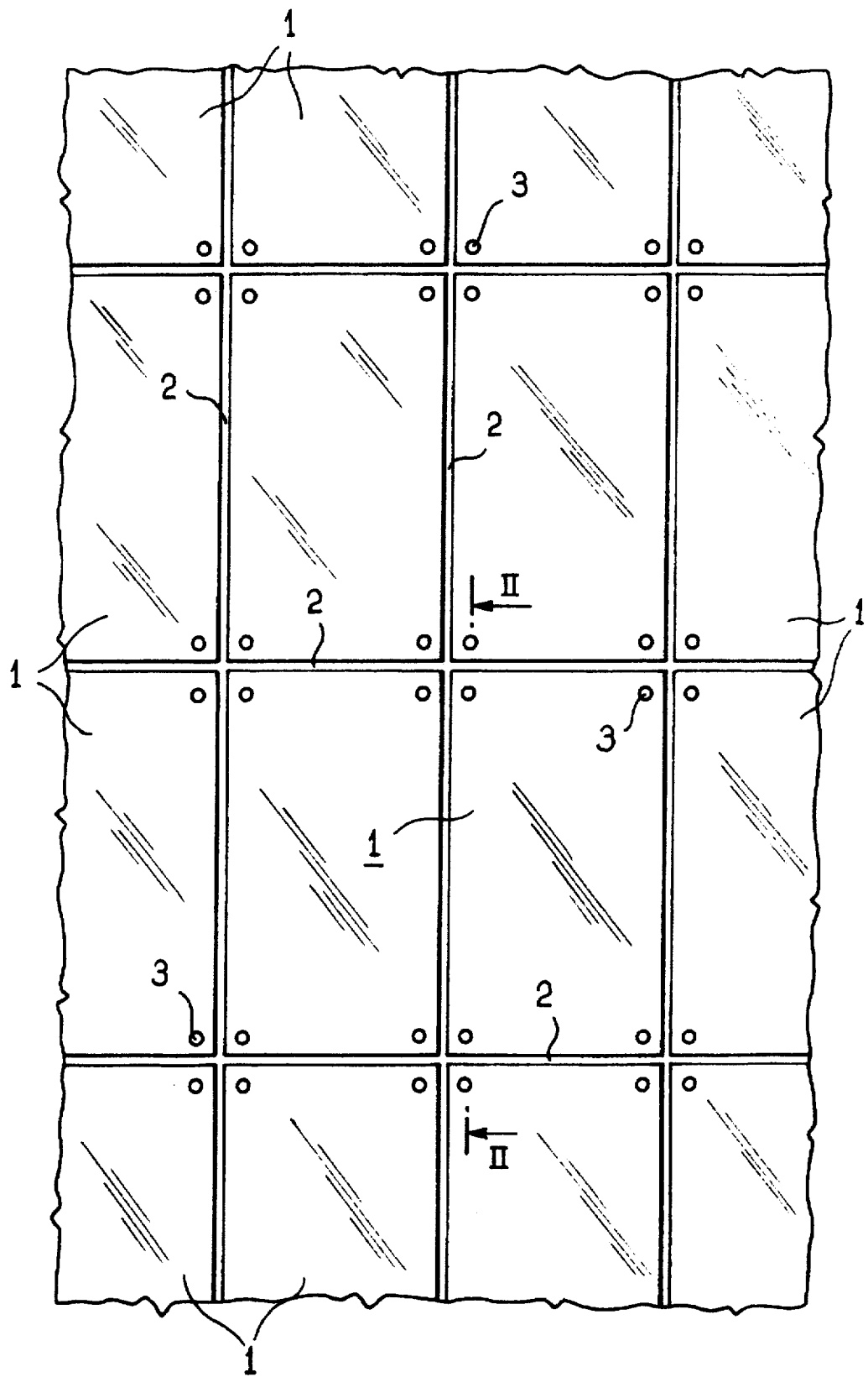
FIG. 1 is an outer view of a facade equipped with panes hung by mechanical attachment points.

In FIG. 1, panes 1 are separated by seals 2 of small width, each of the panes 1 being mechanically fixed to the carrying structure of the building at its four corners by hanging points 3 in such a way that the external surface exhibits overall no projecting element. Fixing locations other than at the corner are also possible.

Figure 2:
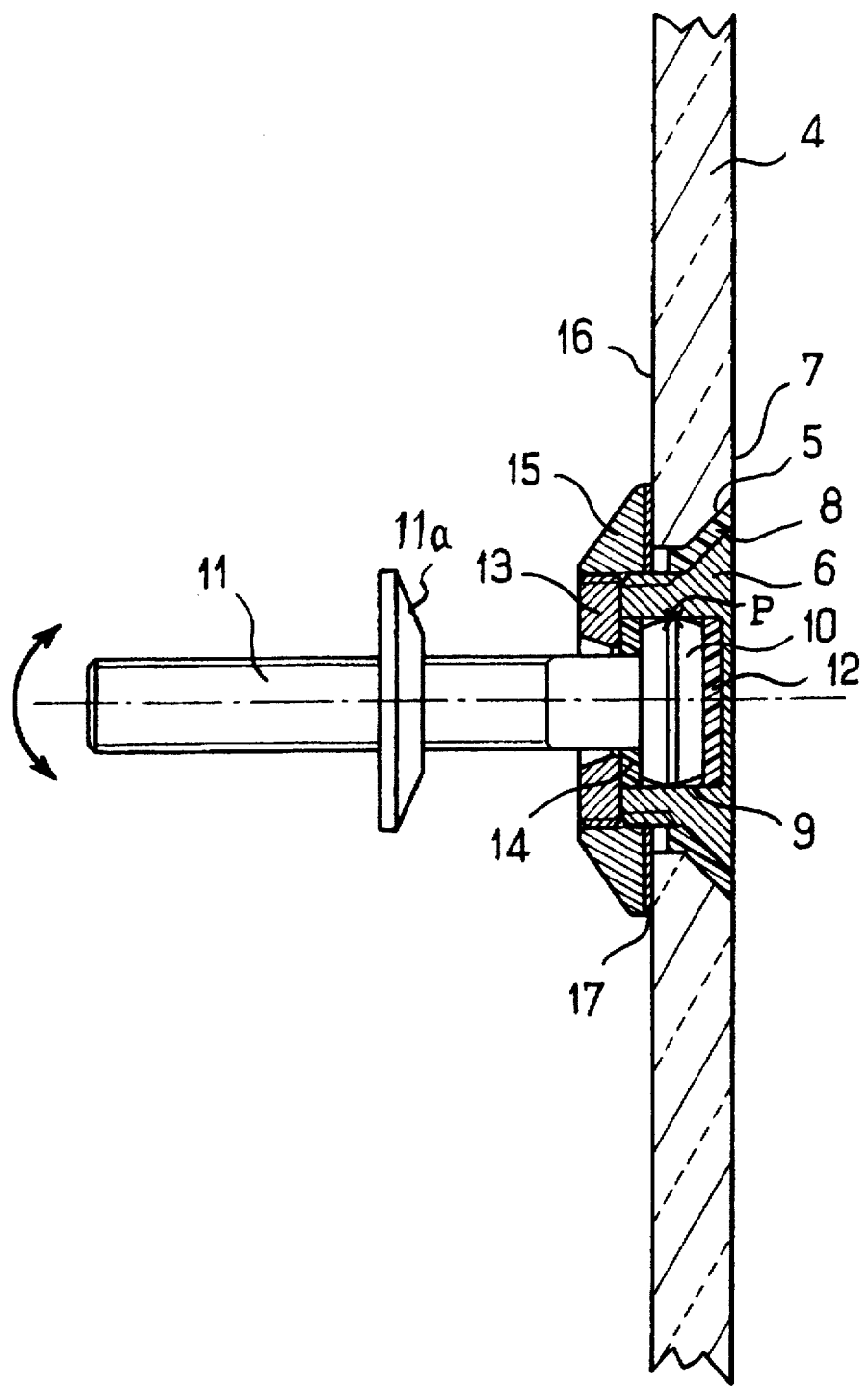
FIG. 2 is a cross-sectional view, at line II—II, of an attachment point of a monolithic pane hung as in FIG. 1.

In FIG. 2, a single pane 4 of clear silico-sodo-calcic glass, preferably of at least 8 millimeters in thickness, for example having a thickness of 12, 15 or 19 millimeters, is perforated by a bevelled hole 5 at each of its four corners. This hole is traversed by a cavity defining element in the form of a metal screw 6, also bevelled, the head of which is flush with the face 7 of the pane intended to be on the "outer" face of the building facade when the pane has been fixed to the facade. A flexible ring seal 8 is interposed between the screw 6 and the sides of the hole 5 in order to prevent any direct contact between glass and metal.

The screw 6 is hollowed, to form a cylindrical cavity 9. In this cavity 9 is seated, with a certain play, the head 10 of a carrying element in the form of a rod element 11. The other end of the rod element is threaded to enable it to be connected to the carrying structure of the building, not shown, optionally via the nut 11a.

The head 10 has a plane front face, which bears against the base of the cavity via a seal 12 of an elastomer having a Shore hardness of approximately 50. The lateral face of the head 10 is a surface of revolution formed by the association of two conical portions separated by an intermediate annular portion. The head 10 is held in position in the cavity by a clamping piece 13 via a washer 14 of an elastomer similar to that of the seal 12. A certain play is maintained between the screw 6 and the head 10, by choosing the diameter of the cavity 9 to be slightly greater than that of the annular zone of the head 10, and by choice of the flexible materials 12 and 14 interposed between the head 10 and the base of the screw. The deflection of the rod 11 is permitted by an internally diverging profile of the clamping piece 13.

The assembly is united by a nut 15 which is screwed onto both the screw 6 and the clamping piece 13, and which presses on the inside face 16 of the installed pane, via a flexible washer 17.

The above connection functions in the following manner. Once the pane has been attached, as shown in FIG. 2, in a substantially vertical plane, its bearing point in the mechanical connection will be situated approximately in an upper part of the annular zone of the head 10, the bearing point (or zone) being marked in the Figure by the letter P. The pane 4 will therefore be able to tilt about this point P in a pendular manner and in any direction, the tilting occurring due to the tilting of the head 10 about point P in cavity 9, which will lead to a local crushing of the seals 12 and 14.

The amplitude of the bending allowed for the pane is controlled by defining the clearance that is left between the head 10 and the cavity 9 receiving it, and also by the capacity to accept compression, represented in the present case by Shore hardness, of the seals 12 and 14. Usually, these parameters are adjusted so that the bending amplitude is a few degrees, which is sufficient to allow the pane to bend slightly, either in the case of very strong winds or in order to take into account tolerances with regard to its positioning relative to the carrying structure.

Figure 3:
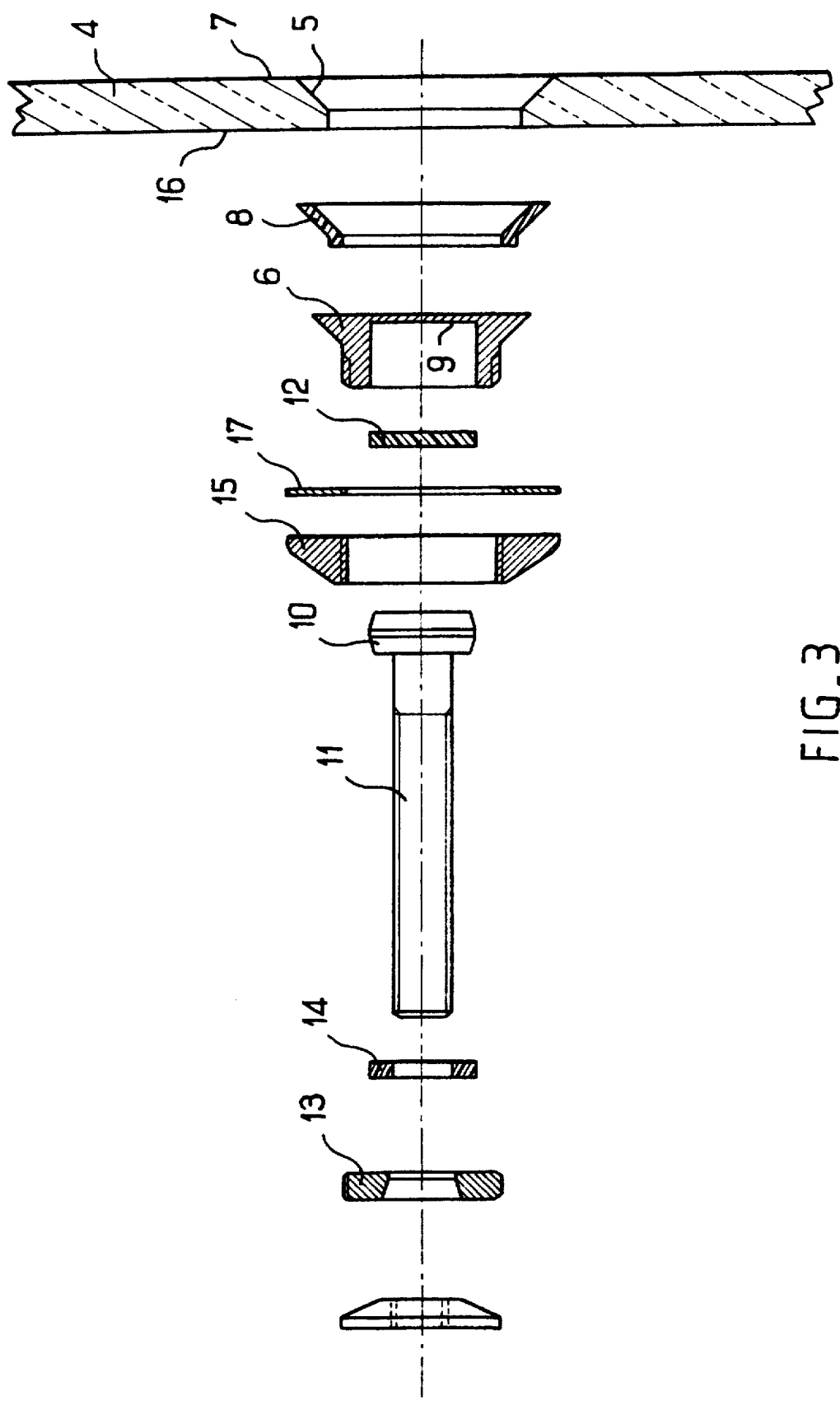
FIG. 3 is an exploded view of the mechanical connection shown in FIG. 2.

Referring to FIG. 3, in the assembly of the connection of FIG. 2, the screw 6 is slid, from the side of the outer face 7 of the pane 4, into its ring seal 8. The screw 6 is then tightened onto the pane by means of the nut 15 and seal 17. The seal 12 is then slid into the base of the cavity 9, and then the head 10 of the rod 11, around which the washer 14 has been threaded, is fitted into the cavity. Lastly, the head 10 is tightened in the cavity by screwing the clamping piece 13 into the nut 15.

Figure 4:
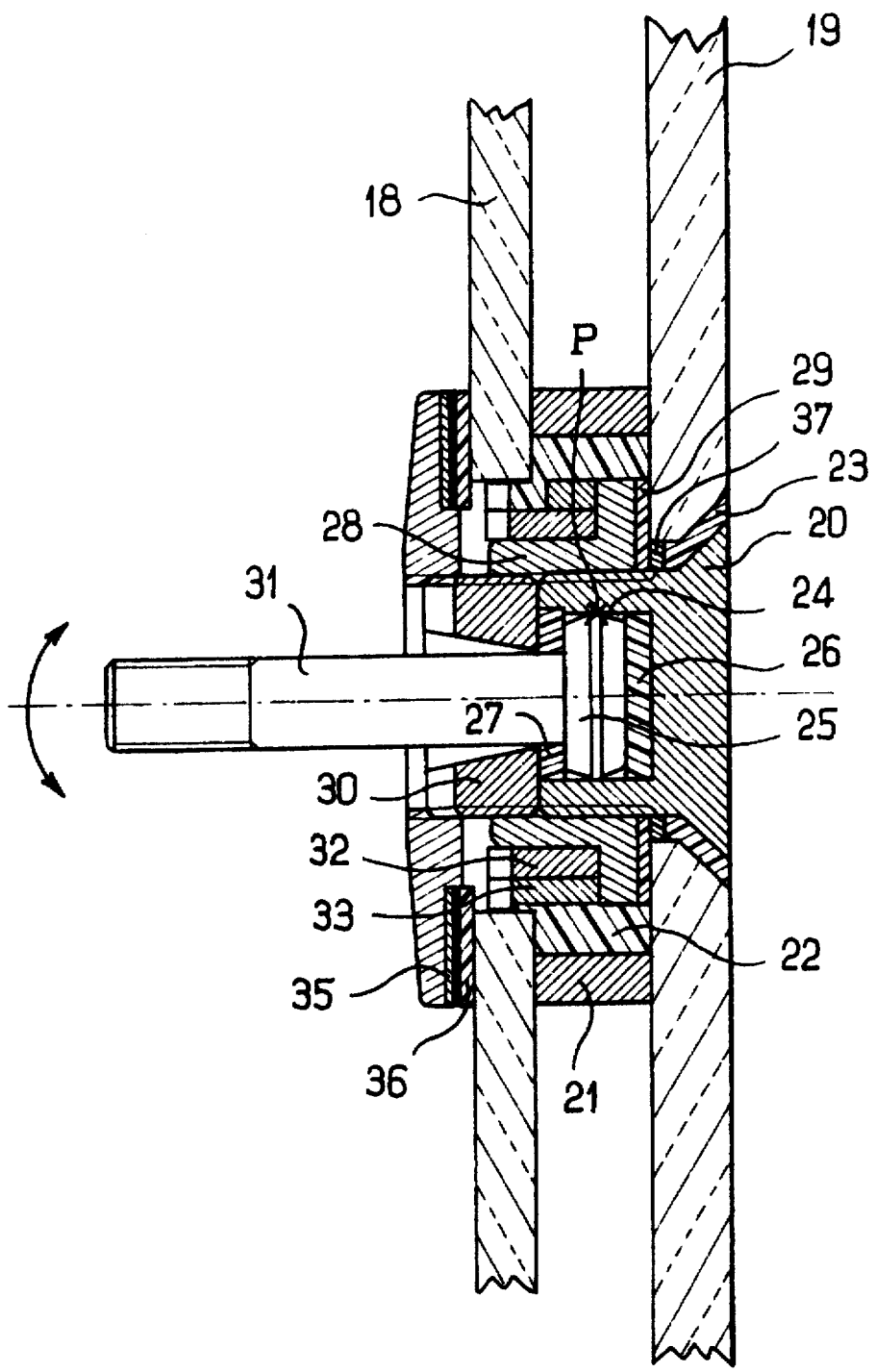
FIG. 4 is a cross-sectional view of an attachment point of a double glazing unit hung as in FIG. 1
Figure 5:
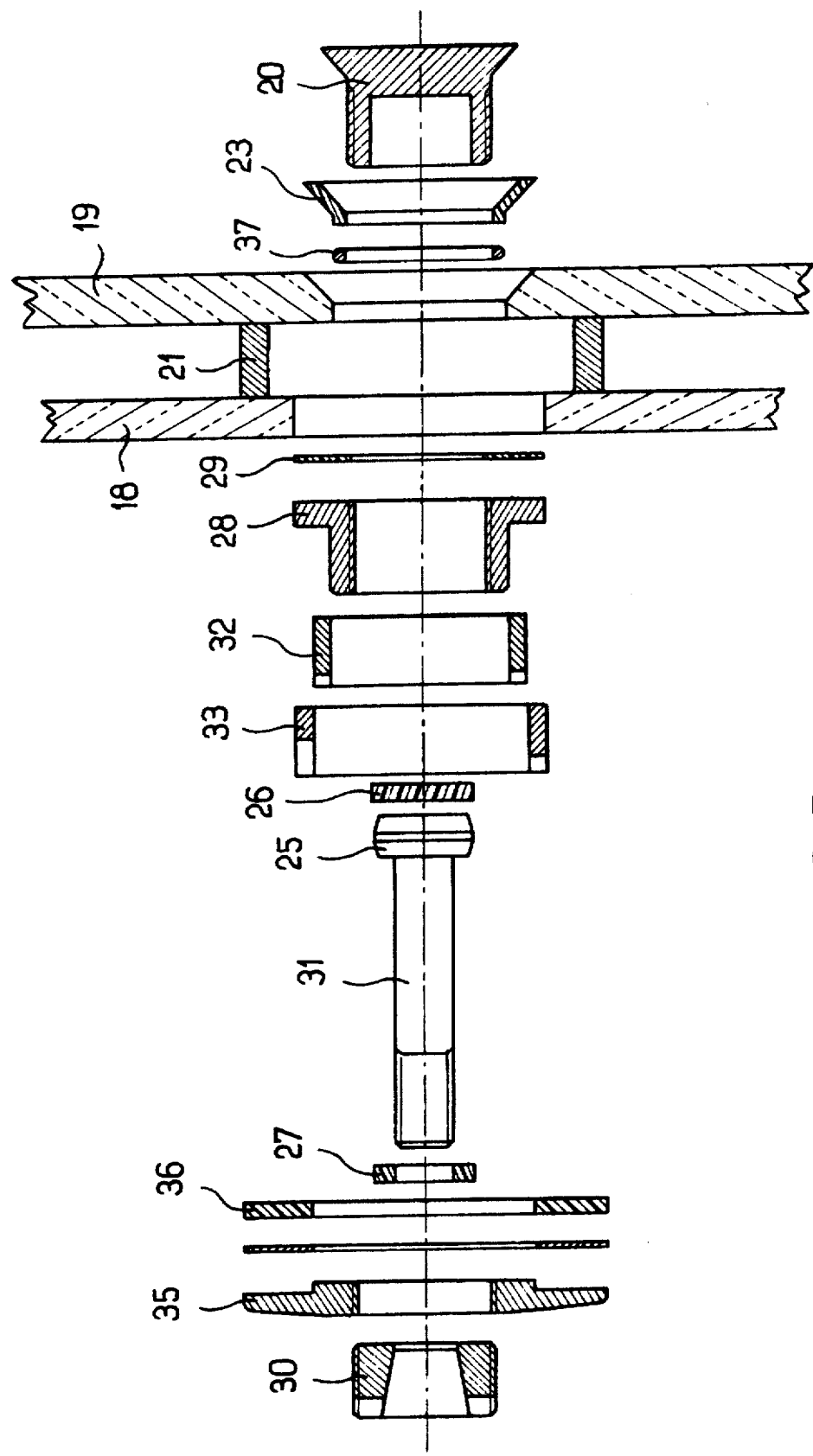
FIG. 5 is an exploded view of the mechanical connection shown in FIG. 4.

In the double glazing of FIG. 4, the pane is composed of an internal glass sheet 18 and an external glass sheet 19, both of silico-sodo-calcic float glass. The terms "external" and "internal" refer to the position of each of these sheets relative to the facade. At least one of the sheets may have a laminated structure.

The two sheets 18 and 19 are separated by a gas or air gap and are assembled together by means of a peripheral spacer frame, not shown, equipped with seals known in the art. At the mechanical attachment or hanging point, the external sheet 19 is perforated with a bevelled circular hole, and the internal sheet 18 with another circular hole larger than, and centered on, the former.

A metal screw 20 having a bevelled head passes through the two sheets 18 and 19 via the circular holes which have previously been sealed, for example as described in European Patent Application EP-A-0 506 522, by means of a metal ring 21 coated with a first seal of butyl rubber, not illustrated, and then a second seal 22 of silicone. The screw 20 is flush with the surface of the outer sheet 19, and is provided with a flexible ring seal 23. It has a structure similar to that of the screw described with reference to FIG. 2. It has a cylindrical cavity 24 in which the head 25 of a rod element is seated with a certain play, this rod element being similar to that of FIG. 2.

Also present in the cylindrical cavity 24, as previously, are two compressible seals 26 and 27.

The features that differ from FIG. 2 lie primarily in the presence of a supplementary clamping nut 28 which is fixed to the outer sheet 19 by screwing onto the screw 20 until it bears against the internal face of sheet 19 via a flexible seal 29. An O-ring 37 forms the junction between the base of the ring seal 23 and the flexible seal 29. A clamping piece 30 is screwed onto the clamping nut 28 and against the screw 20, which holds the head 25 in place. The diverging internal profile of the clamping piece allows the rod 31 a certain angular deflection.

Between the clamping nut 28 and the hole formed in the inner sheet 18, there are interposed two eccentric circular rings 32 and 33 which will allow correction of any centering defect between the holes formed in the two sheets. These rings and their principle of operation are disclosed in European Patent Application EP-A-0 506 522, already mentioned, to which reference should be made for further details. The clamping nut 28 will therefore support the inner sheet 18 via rings 32 and 33.

The tightening of the mechanical connection is achieved by a lock-nut 35 which is screwed onto the clamping piece 30 and presses against the inner face of the inner sheet 18 by means of a flexible seal 36.

As in FIG. 2, the double glazing will be able to tilt around the bearing point P of with a pendular movement. It may be noted that the mechanical connection thus achieved allows a transfer of weight from one sheet to the other, and therefore does not excessively load the peripheral seal of the double glazing unit.

During assembly, the screw 20 is slid into ring seal 23 from the side of the external sheet 19. The O-ring 37, intended for improving sealing, notably against water, is then placed against the base of the ring seal 23 from the side of the internal sheet 18. Finally, the flexible seal 29 and the clamping nut 28 are mounted, which connects the elements to the external sheet, and the two eccentric rings 32 and 33 are installed.

A silicone seal 22 is then deposited against the metal ring 21, which is already precoated during the assembling of the double glazing with a first seal based upon butyl rubber. The seal 26 is then placed in the base of the cavity 24, the head 25 of the rod element 31 is introduced and the washer 27 is slid around the rod. The assembly of the components 25, 26 and 27 is then united by screwing in the clamping piece 30.

Lastly, the assembly is tightened by a lock-nut 35 and its associated seals, including the seal 36 which bears against the inner face of the sheet 18.

It may be noted that it is possible to break down the assembling operation into several phases. Thus, a first phase can be carried out at the place of manufacturing or of conversion of the double glazing unit itself, consisting of performing all the assembling steps described above as far as the installation of the eccentric rings 32 and 33.

Thus devoid of "projecting" parts, the double glazing units can be easily stored and transported, in a minimum of volume and without risk of breakage. It is only the further steps of assembling that are carried out on site.

Figure 6:
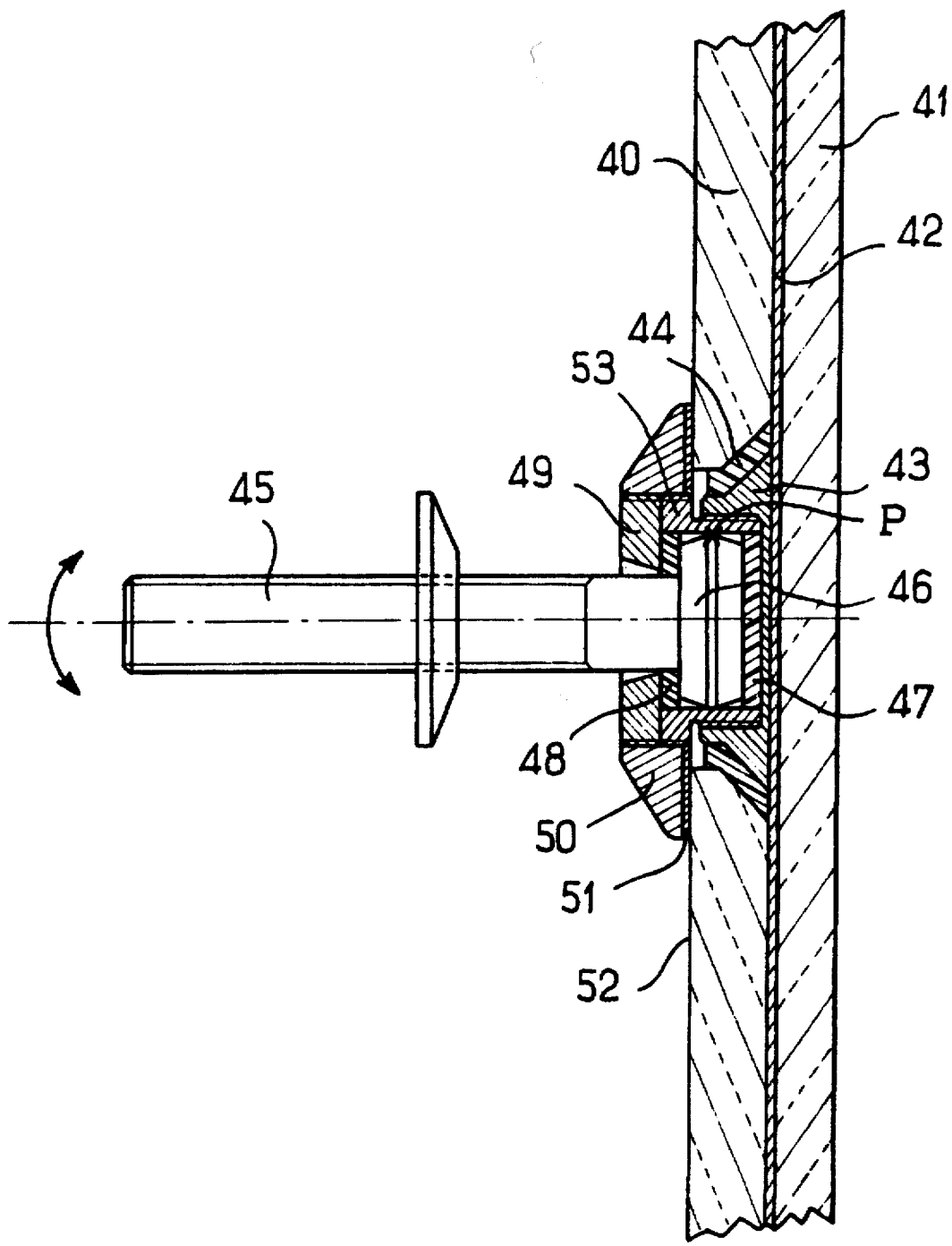
FIG. 6 is a cross-sectional view of an attachment point of a laminated pane hung as in FIG. 1.
Figure 7:
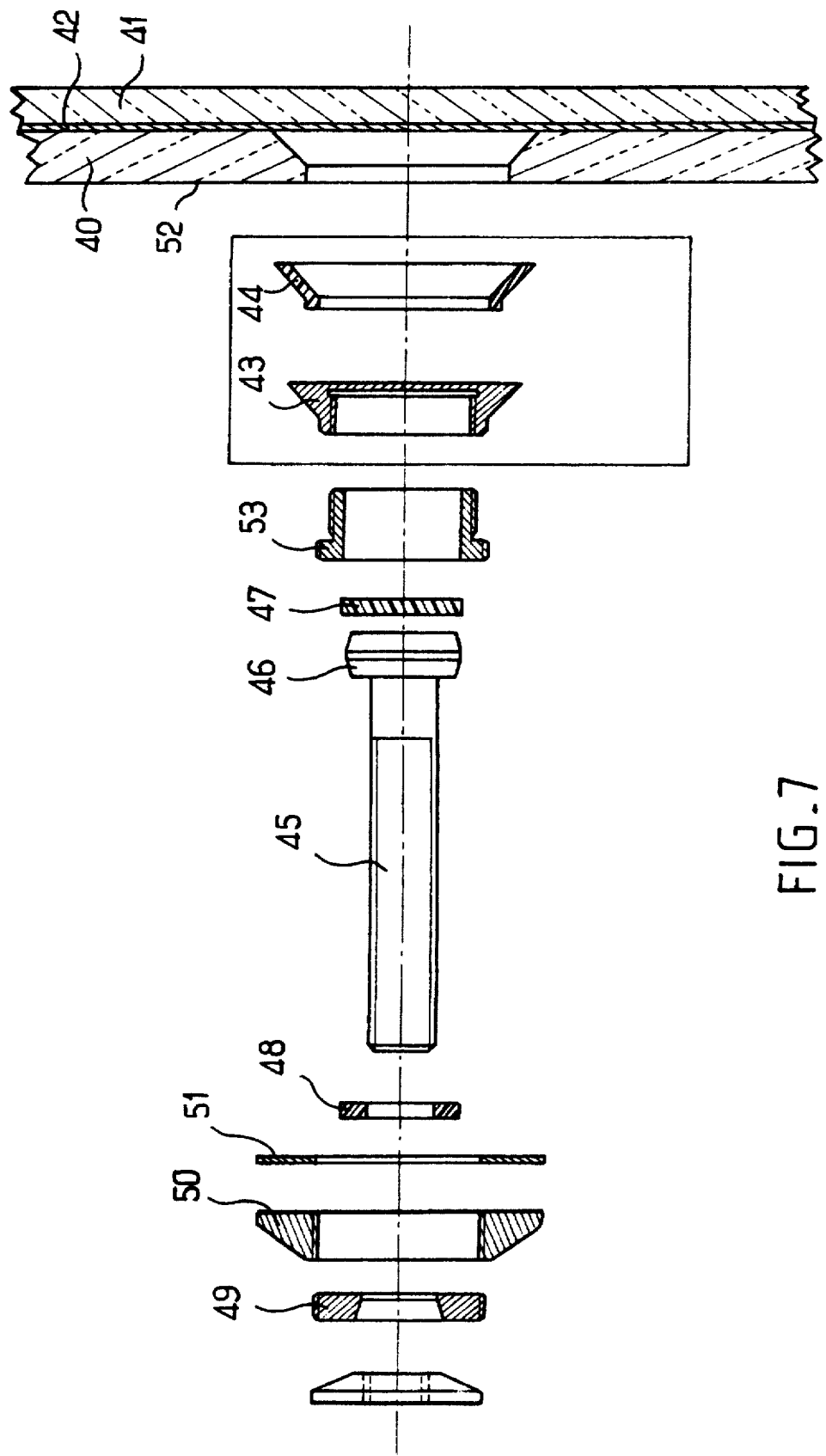
FIG. 7 is an exploded view of the mechanical connection shown in FIG. 6.

FIGS. 6 and 7 relate to a mechanical connection according to this inventions in this case adapted to laminated panes.

FIG. 6 shows the connection, after the pane has been fixed to the facade. The pane is, in this case, composed of an internal plate 40 of silico-soda-calcic float glass, assembled to an external plate 41 of glass of the same nature by means of an intermediate sheet 42 of plastic material of the polyvinyl butyral type, in known manner. In this case it is only the internal plate 40 that is perforated by a bevelled hole into which, as before, there is inserted a hollow screw 43 by means of a ring seal 44, the screw head bearing against the surface of the intermediate sheet 42. Thus, no projecting element will be visible on the facade from the outside, which is especially aesthetic and eliminates any possibility of a thermal bridge between the outside and the inside.

The rod element 45 is equipped with a head 46, and the clamping piece 49 is mounted via the nut 50 which bears against the surface 52 of the internal plate 40 via a seal 51. The principal differences from the mechanical connections adapted for monolithic panes (FIG. 2) or for double glazing panes (FIG. 4) lie in the dimensioning of the hollow screw 43 and in the fact that the screw includes a supplementary component 53. The hollow screw is much shorter; there remains virtually only its conical head. It define a cavity, only the circular base of which is in contact with a compressible seal 47.

The lateral walls of the screw cavity are provided with a screw thread, into which is screwed the nut-like component 53, which also has a cylindrical cavity, in which the head 46 and washer 48 become seated. Thus the previous long hollow screw is replaced by a screw head 43 supplemented by a component 53.

The advantage of this modification is that it allows the assembling and calendaring of the laminated pane to be easily carried out, which will be better understood from looking at FIG. 7: the components 44 and 43 surrounded by a box in FIG. 7 are the components that are placed in position during the assembling of the laminated pane and that are therefore present during its calendaring.

The screw 43 is sufficiently short for no element to "project" beyond the faces of the plates 40 and 41 while they are being calendared, which is very advantageous because it is possible to carry out this calendaring without any modification in its usual parameters.

After calendaring, all the other components of the connection are assembled: the component 53, the seal 47, the head 46 which becomes seated in the cavity of the component 53, the second seal 48, the nut 50 and its seal 51 and the clamping piece 49. As in the case of the double glazing units, some of these components may not be installed until on site, because the laminated pane provided with the components 43 and 44 can be easily stored and transported as it is.

A variant adapted to laminated panes may consist of using a non-bevelled hollow screw, the head of which is provided with a specific washer glued to the outer glass sheet by means of an intermediate sheet, as described in European Patent Application EP-A-0 340 089.

In conclusion, the articulated connections according to this invention can be easily adapted to varied types of panes.

They are simple to construct, reliable in use because they reduce any risk of jamming or seizing. They may be assembled in one or more phases without particular complexity of assembly. Furthermore, bending control is maintained perfectly once in position, by the choice of the play between the cavity and articulated head and of the compressibility of the flexible seals which form part of the pendular articulation.

Obviously, numerous modifications and variations of the present invention are possible in light of the above teachings. It is therefore to be understood that the invention may be practiced otherwise than as specifically described herein.

What is claimed is:

1. A connecting assembly for mechanical connection of at least one glazing element to a support structure therefor, such that the glazing element is maintained in a vertical plane and such that the glazing element is able to bond with a controlled amplitude, comprising:

a cavity defining element for engaging the at least one glazing element; and a carrying element for being connected to the supporting structure and having a portion fittable in a cavity defined by said cavity defining element so as to form an articulated connection with said cavity defining element, said articulated connection having a bearing region and supporting the at least one glazing element for turning with a substantially frictionless pendular motion about a support point on the bearing region, wherein said carrying element comprises:

a rod connectable to the supporting structure:

an enlarged, rounded head formed at one end of said rod and comprising the portion fittable in said cavity to form said articulated connection said rounded head contacting the cavity defining member at the support point and having a smaller radius of curvature than that of said cavity so that the rounded head fits with play in said cavity to permit the pendular motion;

at least one clamping element retaining said head in said cavity.

2. The assembly of claim 1 wherein said cavity is cylindrical and wherein said head has a convex lateral surface.

3. The assembly of claim 1 including at least one first compressible seal in a base of said cavity.

4. The assembly of claim 3 including at least one second compressible seal mounted to said rod and fitted in said cavity.

5. The assembly of claim 4 wherein said first and second compressible seals comprise at least one from the group consisting of an elastomeric material having a Shore hardness of 30 to 80, and metal spring washers.

6. The assembly of claim 1 wherein said cavity defining element comprises a hollow screw having a bevelled head, said bevelled head fitting in a bevelled aperture in said at least one glazing element, further comprising a lining material fitted between said bevelled head and said bevelled aperture.

7. The assembly of claim 6 wherein said bevelled head is flush with an outer surface of said at least one glazing element.

8. A system comprised of a support structure and at least one glazing element mechanically connected to the support structure by a connecting assembly, such that the glazing element is maintained in a vertical plane and such that the glazing element is able to bond with a controlled amplitude, said connecting assembly comprising:

a cavity defining element engaging the at least one glazing element; and a carrying element connectable to the supporting structure and having a portion fittable in a cavity defined by said cavity defining element so as to form an articulated connection with said cavity defining element, said articulated connection having a bearing region and supporting the at least one glazing element for turning with a substantially frictionless pendular motion about a support point on the bearing region, wherein said carrying element comprises:

a rod connectable to the supporting structure;

an enlarged, rounded head formed at one end of said rod and comprising the portion fittable in said cavity to form said articulated connection, said rounded head contacting the cavity defining member at the support point and having a smaller radius of curvature than that of said cavity so that the rounded head kits with play in said cavity to permit the pendular motion: and at least one clamping element retaining said head in said cavity.

9. A system comprised of a support structure and a plurality of glazing elements disposed edge to edge so as to define an outer wall, the glazing elements being mechanically connected to the support structure by a connecting assembly, such that the glazing element is maintained in a vertical plane and such that the glazing element is able to bend with a controlled amplitude, said connecting assembly comprising:

a cavity defining element engaging the at least one glazing element; and a carrying element connectable to the supporting structure and having a portion fittable in a cavity defined by said cavity defining element so as to form an articulated connection with said cavity defining element, said articulated connection having a bearing region and supporting the at least one glazing element for turning with a substantially frictionless pendular motion about a support point on the bearing region, wherein said carrying element comprises:

a rod connectable to the supporting structure;

an enlarged, rounded head formed at one end of said rod and comprising the portion fittable in said cavity to form said articulated connection, said rounded head contacting the cavity defining member at the support point and having a smaller radius of curvature than that of said cavity so that the rounded head fits with play in said cavity to permit the pendular motion; and at least one clamping element retaining said head in said cavity.

10. The system of claim 8 wherein said carrying element further comprises at least one clamping element retaining said head in said cavity.

11. A connecting assembly for mechanical connection of at least one glazing element to a support structure therefor, such that the glazing element is maintained in a vertical plane and such that the glazing element is able to bend with a controlled amplitude, comprising:

a cylindrical cavity defining element engaging the at least one glazing element; and a carrying element connectable to the supporting structure and having a portion fittable in a cavity defined by said cavity defining element so as to form an articulated connection with said cavity defining element, said articulated connection having a bearing region and supporting the at least one glazing element for turning with a pendular motion about the bearing region, wherein said carrying element comprises a rod connectable to the supporting structure; an enlarged, rounded head formed at one end of said rod and comprising the portion fittable in said cavity to form said articulated connection, said rounded head having a convex lateral surface contacting the cavity defining member at the bearing region and having a smaller radius of curvature than that of said cavity so that the rounded head fits with play in said cavity to permit the pendular motion; and at least one clamping element retaining said head in said cavity, and wherein said convex lateral surface comprises a central planar annular portion; and two oppositely oriented conical portions at opposite sides of said annular portion, said annular portion contacting said cavity defining element at said bearing portion.

12. A connecting assembly for mechanical connection of at least one glazing element to a support structure therefor, such that the glazing element is maintained in a vertical plane and such that the glazing element is able to bend with a controlled amplitude, comprising:

a cavity defining element engaging the at least one glazing element; and a carrying element connectable to the supporting structure and having a portion fittable in a cavity defined by said cavity defining element so as to form an articulated connection with said cavity defining element, said articulated connection having a bearing region and supporting the at least one glazing element for turning with a pendular motion about the bearing region, wherein said carrying element comprises a rod connectable to the supporting structure; an enlarged, rounded head formed at one end of said rod and comprising the portion fittable in said cavity to form said articulated connection, said rounded head contacting the cavity defining member at the bearing region and having a smaller radius of curvature than that of said cavity so that the rounded head fits with play in said cavity to permit the pendular motion; and at least one clamping element retaining said head in said cavity; and wherein said cavity defining element comprises a hollow screw defining a base of said cavity, said hollow screw having a bevelled head fitted in a bevelled aperture in said at least one glazing element; and another component screwed into said hollow screw and defining lateral walls of said cavity.

13. The assembly of claim 12 wherein said glazing element is a laminated glazing and said bevelled aperture does not extend through an outermost pane of said glazing element.

14. The assembly of claim 12 wherein said at least one clamping element comprises:

a nut screwed to said another component and bearing on said at least one glazing element so as to secure said assembly to the at least one glazing element; and a clamping piece screwed to said nut,
wherein said clamping piece has an internal aperture through which said rod extends, said internal aperture having a diverging profile to permit an angular deflection of the rod therein.

15. The assembly of claim 12 wherein said bevelled head is flush with an outer surface of a pane of said at least one glazing element.

16. A connecting assembly for mechanical connection of at least one glazing element to a support structure therefor, such that the glazing element is maintained in a vertical plane and such that the glazing element is able to bend with a controlled amplitude, comprising:

a cavity defining element engaging the at least one glazing element; and a carrying element connectable to the supporting structure and having a portion fittable in a cavity defined by said cavity defining element so as to form an articulated connection with said cavity defining element, said articulated connection having a bearing region and supporting the at least one glazing element for turning with a pendular motion about the bearing region, wherein said carrying element comprises a red connectable to the supporting structure; an enlarged, rounded head formed at one end of said red and comprising the portion fittable in said cavity to form said articulated connection, said rounded head contacting the cavity defining member at the bearing region and having a smaller radius of curvature than that of said cavity so that the rounded head fits with play in said cavity to permit the pendular motion; and at least one clamping element retaining said head in said cavity; wherein said at least one clamping element comprises a nut screwed to said hollow screw and bearing on said at least one glazing element so as to secure said assembly to the at least one glazing element; and a clamping piece screwed to said nut, wherein said clamping piece has an internal aperture through which said red extends, said internal aperture having a diverging profile to permit an angular deflection of the red therein.

17. The assembly of claim 16 wherein said at least one glazing element comprises a double pane glazing having sealed apertures, wherein said bevelled aperture is in one pane of said double pane glazing and wherein said rod extends through an aperture in another pane of said double pane glazing.

18. The assembly of claim 17, further including a lock nut bearing against an innermost one of said panes.

* * * * *

UNITED STATES PATENT AND TRADEMARK OFFICE
CERTIFICATE OF CORRECTION

PATENT NO. : 5,540,514
DATED : 07/30/96
INVENTOR(S) : YVES DEMARS ET AL

It is certified that error appears in the above-indentified patent and that said Letters Patent is hereby corrected as shown below:

Column 9,
IN THE CLAIMS

Claim 1, line 17, "bond" should be --bend--.

Signed and Sealed this

Tenth Day of December, 1996

Attest:

BRUCE LEHMAN

*Attesting Officer*     Commissioner of Patents and Trademarks